United States Patent [19]
Goossens

[11] Patent Number: 5,401,087
[45] Date of Patent: Mar. 28, 1995

[54] PRESSURE CONTROL VALVE

[75] Inventor: André F. L. Goossens, Rumst, Belgium

[73] Assignee: Alfred Teves Metallwarenfabrik GmbH and Co. OHG, Germany

[21] Appl. No.: 930,704

[22] PCT Filed: Feb. 4, 1992

[86] PCT No.: PCT/EP92/00241

§ 371 Date: Oct. 5, 1992

§ 102(e) Date: Oct. 5, 1992

[30] Foreign Application Priority Data

Feb. 5, 1991 [DE] Germany .................. 41 03 365.5

[51] Int. Cl.⁶ .............................................. B60T 8/36
[52] U.S. Cl. ........................ 303/119.2; 251/129.02; 251/129.07; 251/129.18
[58] Field of Search ............... 303/119.2; 251/129.02, 251/129.07, 129.15; 137/596.17

[56] References Cited

U.S. PATENT DOCUMENTS

| | | |
|---|---|---|
| 1,919,552 | 7/1933 | Hasselquist . |
| 3,538,954 | 11/1970 | Fagerlie et al. . |
| 3,719,401 | 3/1973 | Peruglia ..................... 303/119.2 |
| 4,063,785 | 12/1977 | Tribe . |
| 4,915,134 | 4/1990 | Toliusis et al. . |
| 5,050,642 | 9/1991 | Bright ........................ 251/129.07 |
| 5,076,538 | 12/1991 | Mohr et al. ............... 303/119.2 X |

FOREIGN PATENT DOCUMENTS

| | | |
|---|---|---|
| 0317305 | 5/1989 | European Pat. Off. . |
| 957864 | 2/1950 | France . |
| 1481372 | 5/1967 | France . |
| 1690015 | 9/1954 | Germany . |
| 951063 | 10/1956 | Germany . |
| 1175049 | 7/1964 | Germany . |
| 2114249 | 10/1972 | Germany . |
| 3138798 | 4/1982 | Germany . |
| 3130851 | 2/1983 | Germany . |
| 3240276 | 5/1984 | Germany . |
| 3543882 | 6/1987 | Germany ................. 303/119.2 |
| 2021240 | 11/1979 | United Kingdom . |
| 9003500 | 4/1990 | WIPO . |

OTHER PUBLICATIONS

Ronald S. Dise, "Integral Fasteners," Machine Design, S.70-73, Feb. 1986.

Heinz Rösler, "Dichtungen für translatorisch und rotatorisch bewegte Maxchinenelemente," Der Zuliefermarkt, S.37-40, Marz 1987.

Ernest Hörl, "Ventildichtungen in der Pneumatik," O+P Ölhydraulik und Pneumatik, Bd.33, S.93-96, Feb. 1989.

"Praktischer Handgriff erleichtert das Arbeiten mit Spraydosen," Drahwelt, S.173, Mai 1975.

Primary Examiner—Robert J. Oberleitner
Assistant Examiner—Lee W. Young
Attorney, Agent, or Firm—J. Gordon Lewis; Robert P. Seitter

[57] ABSTRACT

A solenoid-operated pressure control valve in which a valve shaft can move transverse to its longitudinal axis to permit self-centering of a closure member at the end of the valve shaft, relative to a valve seat which receives the closure member, when the valve shaft is displaced along its longitudinal axis. Longitudinal displacement of the valve shaft is sealedly guided by at least one sealing element through which the valve shaft extends and which can move along a surface of a guide member against which the sealing element is positioned when the valve shaft undergoes self-centering which is permitted by the clearance fit between the valve shaft and a bore in the guide member through which the valve shaft extends.

28 Claims, 1 Drawing Sheet

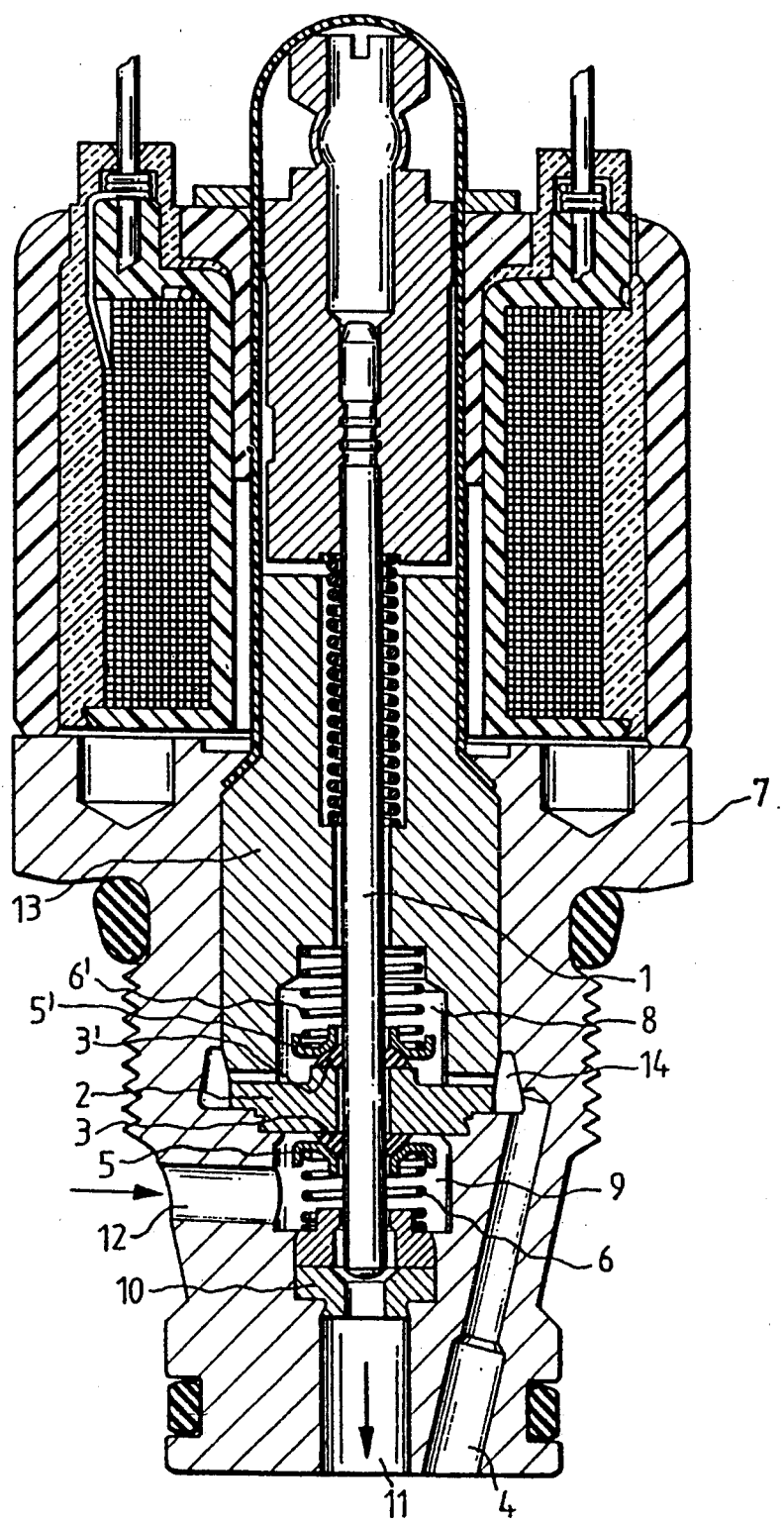

PRESSURE CONTROL VALVE

BACKGROUND OF THE INVENTION

The present invention relates to a pressure control valve, in particular a solenoid-operated valve for brake systems with slip control.

Conventional pressure control valves of this type find use in a wide variety of technical fields of application.

In the German printed and published patent application 32 40 276, a pressure-balanced pressure control valve of the aforementioned type is described. This pressure control valve is provided with a sealing ring inserted in a guide portion which seals a first chamber relative to a second pressure chamber as the clearance fit between the valve shaft and the guide portion is closed to gap leakage flows.

When looking more closely at the valve design, it becomes apparent that a satisfactory sealing effect is only guaranteed when a fit with tight tolerances between the valve shaft and the guide portion of the housing accommodating the sealing element is chosen. However, as miniaturization advances, the establishment of a clearance fit with tolerances that are as tight as possible reaches the limit of practicability in production, because of cost, production, and functional considerations. In addition, a clearance fit which is too tight impairs the capability of self-centering of the valve shaft relative to the valve seat which is required for a perfect valve closing function.

Furthermore, the use of elastomeric seals between the guide web of the housing and the valve shaft, which is known from the prior art, produces, inevitably, high frictional forces which accelerate wear and which must be compensated for by means of correspondingly increased spring forces and magnetic forces. Also, miniaturization of elastomeric seals is possible only to a very limited extent. In another arrangement disclosed in German printed and published patent application 32 40 276, a diaphragm seal, which is attached to the valve shaft and to the valve housing, is used instead of an annular seal. This alternative sealing measure at the valve shaft also is not sufficiently satisfactory in practical use since the radial mismatch required for the self-centering effect of the valve closure member can only be transmitted onto the diaphragm in a reduced way, in particular as the valve size is decreased.

SUMMARY OF THE INVENTION

It is, therefore, an object of the present invention to provide a pressure-balanced, cost-saving pressure control valve of the aforementioned type which guarantees, when miniaturized, a low-friction and, at the same time, leakage-free sealing of the valve shaft relative to the valve guide in the housing without limiting the capability of self-centering of the valve shaft relative to the valve seat.

This object is achieved, according to the present invention, by means of a sealing element abutting against the valve housing which is radially displaceable by the dimension of a clearance fit between the valve shaft and the valve housing.

A specific and favorable aspect of the inventive sealing element is that a portion of the sealing element which is directed away from the valve shaft and the guide portion, is, substantially, shaped as a convex annular surface which is acted upon by a hold-down device for seals. As a result, the sealing forces, which are evenly distributed to a large extent over the circumference of the sealing element, can act on the sealing surfaces without limiting the ability of the sealing element to be radially displaceable at the flat guide portion.

In a preferred embodiment of the present invention, the hold-down device for seals has an inner cone which accommodates, at the same time, in its function as a spring plate, a compression spring. Due to this conical surface, a virtually external pressure acting on the sealing element is produced which urges the sealing element to press on the valve shaft.

Expediently, the hold-down device for seals, along with the compression spring and the sealing element, is aligned co-axially with the valve shaft so that a self-centering alignment of the valve closure member relative to the valve seat, which is free in all directions, is guaranteed.

According to another aspect of the present invention, the convex outer contour of the sealing element can, preferably, correspond precisely to the, substantially, triangular profile cross-section of a sealing ring shape which can be considered, as a whole, as a ball portion so that an identical surface pressure, on all sides of the pressurized areas, results.

In order to prevent a hydraulic pressure above atmospheric and thus a non-return valve effect from occurring when a single sealing element is used in the clearance between the valve shaft and the guide portion, according to another aspect of the present invention a second sealing element is positioned symmetrically on the opposite face of the guide portion diametrically to the first sealing element. Thus, an unpressurized sealing of the clearance between the valve shaft and the guide portion will be guaranteed, irrespective of the direction of hydraulic pressurization, i.e. irrespective of the respective pressures prevailing in the pressure chambers.

In a special design variation, the guide portion is shaped as a disc having a greater structural hardness than the valve housing. As a result, the desired plane faces required for the radial displaceability of the sealing element are produced on the one hand, whereas, on the other hand, the correspondingly great structural hardness, together with the so-called "self-clinching" attachment, will lead to an astonishingly safe and tight anchoring of the guide portion in the valve housing.

The present invention will be described in more detail below with reference to the drawing.

BRIEF DESCRIPTION OF THE DRAWING

The single FIGURE is a vertical sectional view of a pressure control valve constructed in accordance with the present invention.

DETAILED DESCRIPTION OF THE INVENTION

Referring to the drawing, a pressure control valve, constructed in accordance with the present invention, includes a valve shaft 1 having a valve closure member at its lower end. The valve shaft is displaceable along its longitudinal axis and controls the pressure fluid connection between a pressure fluid source, for instance a brake pressure generator, via a first, inlet pressure fluid channel 12 to a second, outlet pressure fluid channel 11, attached on the consumer side, for instance on the wheel brake side. The valve shaft is shown in its unenergized initial position, which permits pressure fluid flow between first pressure fluid channel 12 and second pressure fluid channel 11. A pressure chamber 9, into which pressure fluid channel 12 opens interconnects the first and the second pressure fluid channels 12, 11. Chamber 9 accommodates the sealing element 3 which seals the valve shaft 1 relative to a pressure chamber 8 and is held on an end face of the guide part 2 by a compression spring 6 arranged in pressure chamber 9 which bears against a hold-down device 5. The guide part 2, held between the stepped aperture within the valve housing 7 and the magnet core 13 by means of the "self-clinching" arrangement, has a, preferably, discoid design. Guide portion 2 defines pressure chambers 8 and 9 and has a bore which extends between the two pressure chambers. Valve shaft 1 extends, with play, through the co-axially arranged bore of guide part 2. The clearance between valve shaft 1 and guide portion 2 permits movement of the valve shaft transverse to its longitudinal axis. A stepped bore is provided in that section of magnet core 13 near guide part 2 for accommodation of a second spring 6' which, in a manner similar to the first spring 6, bears against a hold-down device 5' and positions a sealing element 3' on the opposite end face of the guide part 2. By this means, a sufficient sealing effect is achieved between the first and the second pressure chambers 8, 9 in spite of a relatively generous clearance fit between the valve shaft 1 and the bore of the guide part 2. The first pressure chamber 8 extends along the valve shaft 1 up into the hollow space of the valve dome. A permanent pressure compensation between the pressure fluid channel 11 on the consumer side and the first pressure chamber 8 is provided by transverse recesses in that face of the magnet core 13 contacting the guide part 2 and an annular recess 14 within the valve housing 7 connecting the first pressure chamber 8 with the bypass channel 4. The sealing elements 3, 3' are, preferably, made of polytetrafluoroethylene or a comparable material. In order to permit self-centering of the valve shaft 1, the sealing elements 3, 3' are slidingly movable radially relative to the guide portion 2 and valve seat 10 on the end faces of the guide part 2 upon movement of the valve shaft transverse to its longitudinal axis. The directional elasticity of the compression springs 6, 6', which are free from lateral forces, in part, contribute to the free movement of valve shaft 1. When subjected to the hydraulic pressure, the sealing elements 3, 3' have a self-sealing capacity so that even at relatively low spring forces, for instance 50 grams with a valve shaft diameter of 1.6 millimeters, perfect hydraulic tightness as well as minimal frictional forces of only approximately 100 grams are developed at a hydraulic pressure of 100 bar. Due to the extremely low frictional forces, decidedly good radial sliding movement ratios of the sealing elements 3, 3' are achieved which is necessary to obtain the desired self-centering effect. In addition, in the event of only one sealing element being used, the sealing element can take on the function of a non-return valve, depending upon the level and the direction of the hydraulic differential pressure, which, however, is not desired in the case of a pressure-balanced solenoid-operated valve, the design of which has been described above.

The method of assembling the guide portion 2 carrying the sealing elements 3, 3' requires particular accuracy to ensure that a relatively low design clearance between the valve shaft 1 and the bore in the guide portion 2 is provided, while, at the same time, providing an exact alignment of the guide portion 2 relative to the valve seat 10. This is, inevitably, also a precondition for an alignment of the sealing elements with the guide portion which alignment is as exact as possible.

Finally, the mode of operation of the solenoid-operated valve illustrated in the drawing will be described.

The drawing shows the solenoid-operated valve in the non-activated position so that the pressure from the pressure fluid source, available in the second pressure fluid channel 12, is transmitted without hindrance via the second pressure chamber 9 into the first pressure fluid channel 11. Due to the bypass channel 4 opening tangentially into the first pressure fluid channel 11, and with the bypass channel serving as a pressure compensating bore, the pressure, first introduced from the pressure source, can also be transmitted into the ring-shaped recess 14 and into the first pressure chamber 8. This pressure exists, inevitably, also in the hollow space of the valve dome. In the event of an electromagnetic excitation of the valve, the valve shaft 1 is displaced along its longitudinal axis and the closure member is received by valve seat 10 to close the pressure fluid passage to the first, outlet pressure fluid channel 11 leading from the valve seat so that the pressure which is immediately controlled in the direction of the consumer is conducted, via the bypass channel 4, into the first pressure chamber 8. A propagation of the relatively high pressure from the pressure fluid source into the second pressure chamber 9, in the direction of the first pressure chamber 8, is achieved due to the lock position effected by the valve closure member and the sealing elements 3, 3'. Due to the effect of the high pressure prevailing in the pressure chambers 8, 9, the free surfaces of the sealing elements 3, 3' are pressed onto the contact surfaces of the valve shaft 1 and onto the guide portion 2 so that a leakage-free closure of the clearance between valve shaft 1 and guide portion 2, which clearance is provided for the purpose of self-centering, is achieved by the convex shape of the sealing surface and in a hydraulically self-energizing manner without affecting the radial slidability of the sealing elements 3, 3'.

List of References 1 valve shaft
2 guide portion
3, 3' sealing element
4 bypass channel
5, 5' hold-down device for seals
6, 6' compression spring
7 valve housing
8, 9 pressure chamber
10 valve seat
11 first pressure fluid channel
12 second pressure fluid channel
13 magnet core
14 recess

What is claimed:

1. A solenoid-operated pressure control valve for hydraulic brake systems with slip control, comprising a valve shaft having a valve closure member which is guided in a valve housing with the valve shaft sealedly arranged in a guiding portion on the housing side, which guiding portion separates a first pressure chamber from a second pressure chamber, and comprising a pressure compensating channel connecting the first pressure cheer with the second pressure chamber, characterized in that the valve shaft guides at least one element which abuts against the guiding portion and which has a surface in contact with the guiding portion and along which surface the at least one sealing element slides radially relative to the guiding portion by the dimension of a clearance fit prevailing between the valve shaft and the guiding portion in order to hydraulically separate the first pressure chamber from the second pressure chamber.

2. A solenoid-operated pressure control valve according to claim 1, characterized in that the area of the at least one sealing element, which area is directed away from the valve shaft and the guiding portion is, substantially, shaped as a convex annular surface which is acted upon by a holding-down device for sealing by the sealing element.

3. A solenoid-operated pressure control valve according to claim 2, characterized in that the holding down device for sealing by the at least one sealing element has a profiled form with a, substantially, inner cone which is pressed by means of a compression spring under surface pressure against the guiding portion.

4. A solenoid-operated pressure control valve according to claim 3, characterized in that the holding-down device for sealing by the at least one sealing element with the compression spring and the at least one sealing element is co-axially arranged at the valve shaft.

5. A solenoid-operated pressure control valve according to claim 4, characterized in that the profile cross-section of the at least one sealing element has a, substantially, triangular structure having legs which abut against an end face of the valve shaft and the guiding portion, whereas the hypotenuse is acted upon by the holding-down device for sealing by the sealing element.

6. A solenoid-operated pressure control valve according to claim 5, characterized in that the at least one sealing element includes a first sealing element and a second sealing element and the second sealing element is arranged at the guiding portion diametrically to the first sealing element, which second sealing element is held so as to be abuttable by means of a compression spring acting upon another holding-down device for seals.

7. A solenoid-operated pressure control valve according to claim 6, characterized in that the guiding portion, being a separate rotationally symmetric plane component part and having a greater structural hardness than the valve housing, is held in the valve housing, an undercut arranged on the circumference of the guiding portion meshing with the material of the valve housing.

8. A solenoid-operated pressure control valve according to claim 6, characterized in that the ends of the compression springs, which ends are directed away from the holding-down devices for sealing by the at least one sealing element, bear against the internal walls of the two pressure chambers.

9. A solenoid-operated pressure control valve according to claim 1, wherein said guiding portion is shaped as a disk.

10. A solenoid-operated pressure control valve for hydraulic brake systems with slip control, said valve comprising:
a valve housing;
a guide portion mounted within said valve housing defining a first pressure chamber and a second pressure chamber within said valve housing and having a bore extending between said first pressure chamber and said second pressure chamber;
an inlet pressure fluid channel opening into said first pressure chamber;
a magnet core mounted within said valve housing;
pressure compensating means for connecting said first pressure chamber with said second pressure chamber;
a valve shaft displaceable along its longitudinal axis extending through said magnet core and said bore of said guide portion and having a closure member at an end thereof, said bore dimensioned to have a clearance fit with said valve shaft which permits movement of said valve shaft transverse to its longitudinal axis;
a valve seat positioned in said valve housing to receive said closure member upon displacement of said valve shaft along its longitudinal axis;
an outlet pressure fluid channel leading from said valve seat;
and at least one sealing element positioned against said guide portion sealedly surrounding said valve shaft and having a surface in contact with said guide portion and along which surface said at least one sealing element slides radially relative to said guide portion as said valve shaft moves transverse to its longitudinal axis.

11. A solenoid-operated pressure control valve according to claim 10 wherein said at least one sealing element has a convex annular surface away from said guide portion extending from said valve shaft toward said guide portion and said valve further includes a hold-down device bearing against said convex annular surface of said sealing element.

12. A solenoid-operated pressure control valve according to claim 11 wherein said hold-down device has a conical surface bearing against said convex annular surface of said at least one sealing element and said valve further includes a compression spring bearing against said hold-down device and urging said hold-down device toward said guide portion.

13. A solenoid-operated pressure control valve according to claim 12 wherein said valve shaft extends through said hold-down device and said compression spring.

14. A solenoid-operated pressure control valve according to claim 10 further including:
(a) a hold-down device bearing against said at least one sealing element, and
(b) a compression spring bearing against said hold-down device and urging said hold-down device toward said guide portion,
wherein said at least one sealing element has a, substantially, triangular cross section having legs which bear against the said valve shaft and said guide portion and a hypotenuse against which said hold-down device bears as said compression spring urges said hold-down device toward said guide portion.

15. A solenoid-operated pressure control valve according to claim 10, wherein said guide portion is shaped as a disk.

16. A solenoid- operated pressure control valve for hydraulic brake systems with slip control, said valve comprising:
a valve housing;
a guide portion mounted within said valve housing defining a first pressure chamber and a second pressure chamber within said valve housing and having a bore extending between said first pressure chamber and said second pressure chamber;

an inlet pressure fluid channel opening into said first pressure chamber;

a magnet core mounted within said valve housing;

pressure compensating means for connecting said first pressure chamber with said second pressure chamber;

a valve shaft displaceable along its longitudinal axis extending through said magnet core and said bore of said guide portion and having a closure member at an end thereof, said bore dimensioned to have a clearance fit with said valve shaft which permits movement of said valve shaft transverse to its longitudinal axis;

a valve seat positioned in said valve housing to receive said closure member upon displacement of said valve shaft along its longitudinal axis;

an outlet pressure fluid channel leading from said valve seat;

a first sealing element positioned within said first pressure chamber against said guide portion sealedly surrounding said valve shaft and having a surface in contact with said guide portion and along which surface said at least one sealing element slides radially relative to said guide portion as said valve shaft moves transverse to its longitudinal axis;

and a second sealing element positioned within said second pressure chamber against said guide portion sealedly surrounding said valve shaft and having a surface in contact with said guide portion and along which surface said at least one sealing element slides radially relative to said guide portion as said valve shaft moves transverse to its longitudinal axis.

17. A solenoid-operated pressure control valve according to claim 16 wherein:
 (a) said first sealing element has a convex annular surface away from a first surface of said guide portion extending from said valve shaft toward said first surface of said guide portion, and
 (b) said second sealing element has a convex annular surface away from a second surface of said guide portion, opposite from said first surface, extending from said valve shaft toward said second surface of said guide portion, and
said valve further includes:
 (a) a first hold-down device bearing against said convex annular surface of said first sealing element, and
 (b) a second hold-down device bearing against said convex annular surface of said second sealing element.

18. A solenoid-operated pressure control valve according to claim 17 wherein:
 (a) said first hold-down device has a conical surface bearing against said convex annular surface of said first sealing element, and
 (b) said second hold-down device has a conical surface bearing against said convex annular surface of said second sealing element, and--
said valve further includes:
 (a) a first compression spring having a first end bearing against said first hold-down device and a second end bearing against a wall of said first pressure chamber, said first compression spring urging said first hold-down device toward said first surface of said guide portion, and
 (b) a second compression spring having a first end bearing against said second hold-down device and a second end bearing against a wall of said second pressure chamber, said second compression spring urging said second hold-down device toward said second surface of said guide portion.

19. A solenoid-operated pressure control valve according to claim 18 wherein said valve shaft extends through said first and said second hold-down devices and said first and said second compression springs.

20. A solenoid-operated pressure control valve according to claim 16 further including:
 (a) a first hold-down device bearing against said first sealing element,
 (b) a second hold-down device bearing against said second sealing element,
 (c) a first compression spring bearing against said first hold-down device and urging said first hold-down device toward said first surface of said guide portion, and
 (d) a second compression spring bearing against said second hold-down device and urging said second hold-down device toward said second surface of said guide portion, and
wherein:
 (a) said first sealing element has a, substantially, triangular cross section having legs which bear against the said valve shaft and said first surface of said guide portion and a hypotenuse against which said first hold-down device bears as said first compression spring urges said first hold-down device toward said first surface of said guide portion, and
 (b) said second sealing element has a, substantially, triangular cross section having legs which bear against the said valve shaft and said second surface of said guide portion and a hypotenuse against which said second hold-down device bears as said second compression spring urges said second hold-down device toward said second surface of said guide portion.

21. A solenoid-operated pressure control valve according to claim 16, wherein said guide portion is shaped as a disk.

22. A solenoid-operated pressure control valve according to claim 16 wherein said guide portion is fitted between said magnet core and a stepped surface in said valve housing.

23. A solenoid-operated pressure control valve according to claim 22 wherein said guide portion has a greater structural hardness than said valve body.

24. A solenoid-operated pressure control valve according to claim 22 wherein said pressure compensating means include:
 (a) radially extending passages extending from said second pressure chamber and defined by said guide portion and said magnet core,
 (b) an annular passage extending around the circumference of said guide portion and into which said radially extending passages open, and
 (c) a bypass channel extending between said annular passage and said outlet pressure fluid channel.

25. A solenoid-operated pressure control valve for hydraulic brake systems with slip control, said valve comprising:
 a valve housing having a stepped surface;
 a magnet core mounted within said valve housing;
 a guide portion:

(a) mounted within said valve housing defining a first pressure chamber and a second pressure chamber within said valve housing and having a bore extending between said first pressure chamber and said second pressure chamber, and (b) fitted between said magnet core and said stepped surface of said valve housing;

an inlet pressure fluid channel opening into said first pressure chamber;

pressure compensating means for connecting said first pressure chamber with said second pressure chamber;

a valve shaft displaceable along its longitudinal axis extending through said magnet core and said bore of said guide portion and having a closure member at an end thereof, said bore dimensioned to have a clearance fit with said valve shaft which permits movement of said valve shaft transverse to its longitudinal axis;

a valve seat positioned in said valve housing to receive said closure member upon displacement of said valve shaft along its longitudinal axis;

an outlet pressure fluid channel leading from said valve seat;

and at least one sealing element positioned against said guide portion sealedly surrounding said valve shaft and radially displaceable relative to said guide portion as said valve shaft moves transverse to its longitudinal axis.

26. A solenoid-operated pressure control valve according to claim 25 wherein said guide portion has a greater structural hardness than said valve body.

27. A solenoid-operated pressure control valve according to claim 25 wherein said pressure compensating means include:

(a) radially extending passages extending from said second pressure chamber and defined by said guide portion and said magnet core, (b) an annular passage extending around the circumference of said guide portion and into which said radially extending passages open, and (c) a bypass channel extending between said annular passage and said outlet pressure fluid channel.

28. A solenoid-operated pressure control valve according to claim 25, wherein said guide portion is shaped as a disk.

* * * * *

UNITED STATES PATENT AND TRADEMARK OFFICE
CERTIFICATE OF CORRECTION

PATENT NO.   : 5,401,087
DATED        : March 28, 1995
INVENTOR(S)  : Goossens

It is certified that error appears in the above-identified patent and that said Letters Patent is hereby corrected as shown below:

In column 4, claim 1, line 65, delete "cheer" and substitute therefor --chamber--

Signed and Sealed this

Fourth Day of July, 1995

BRUCE LEHMAN

*Attest:*

*Attesting Officer*   *Commissioner of Patents and Trademarks*